US012214696B1

(12) United States Patent
Sjöstrand et al.

(10) Patent No.: US 12,214,696 B1
(45) Date of Patent: Feb. 4, 2025

(54) HIGH SPEED CONTROL OF MOTOR CURRENT IN A DISTRIBUTED INVERTER SYSTEM

(71) Applicant: Volvo Car Corporation, Gothenburg (SE)

(72) Inventors: Samuel Sjöstrand, Gothenburg (SE); Katriine Koit, Gothenburg (SE); Aditya Pratap Singh, Gothenburg (SE); Torbjörn Thiringer, Gothenburg (SE); Markus Ekström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/353,448

(22) Filed: Jul. 17, 2023

(51) Int. Cl.
*B60L 58/18* (2019.01)
*B60L 50/60* (2019.01)

(52) U.S. Cl.
CPC .............. *B60L 58/18* (2019.02); *B60L 50/60* (2019.02); *B60L 2240/421* (2013.01); *B60L 2240/423* (2013.01); *B60L 2240/547* (2013.01)

(58) Field of Classification Search
CPC .... B60L 58/18; B60L 50/60; B60L 2240/421; B60L 2240/423; B60L 2240/547
See application file for complete search history.

(56) References Cited

U.S. PATENT DOCUMENTS

| | | |
|---|---|---|
| 2022/0037702 A1 | 2/2022 | Forssell et al. |
| 2022/0037703 A1 | 2/2022 | Forssell et al. |
| 2022/0037704 A1 | 2/2022 | Forssell et al. |
| 2022/0037902 A1 | 2/2022 | Forssell et al. |
| 2023/0091529 A1 | 3/2023 | Ekstrom |
| 2023/0093000 A1 | 3/2023 | Ekstrom |
| 2023/0093714 A1 | 3/2023 | Ekstrom |
| 2023/0173948 A1 | 6/2023 | Larsson et al. |

OTHER PUBLICATIONS

Extended EP Search Report for EP Application No. 24189152.2 dated Dec. 17, 2024.
Koit, et al., "High Speed Control of Motor Current in a Distributed Inverter System," Chalmers University of Technology, Master's thesis 2023.

*Primary Examiner* — Robert L Deberadinis
(74) *Attorney, Agent, or Firm* — Amin, Turocy & Watson, LLP

(57) ABSTRACT

Systems, devices, computer-implemented methods, and/or computer program products that can facilitate optimized control of an electric motor of an electric vehicle using a smartcell battery system are addressed. In an example, the system uses a central controller that wirelessly communicates with local controllers connected to clusters of battery cells configured to generate a three-phase current output to control the motor torque. The central controller and the local controllers perform a main control loop to control the three-phase current output with an update frequency of about 1 kHz. A local control loop with an update frequency of about 10 kHz is further implemented by the local controllers within the main control loop to detect and minimize disturbances in the motor operation using estimated local control information.

20 Claims, 9 Drawing Sheets

HIGH SPEED CONTROL OF MOTOR CURRENT IN A DISTRIBUTED INVERTER SYSTEM

TECHNICAL FIELD

The subject disclosure relates to electric and/or hybrid electric vehicle drive technologies, and more particularly to techniques for optimizing control of motor current at high speeds in a distributed inverter system.

BACKGROUND

Currently, Electric vehicles (EVs) are becoming increasingly popular as a more sustainable mode of transportation. However, to improve the performance and efficiency of EVs, it is necessary to develop advanced control techniques for the electric motor. This is because EVs require precise and fast control of the electric motor current to achieve high speeds and acceleration while maintaining safe and reliable operation. With better control, EVs can achieve higher performance and acceleration, making them more competitive with traditional fossil-fueled vehicles.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate optimizing control of motor current at high speeds in a distributed inverter system.

In an embodiment, a system can comprise a smartcell battery system that supplies power to an electric motor of an electric vehicle, the smartcell battery system comprising a plurality of battery cells arranged in three strings that provide respective phase currents of a three-phrase current used to drive the electric motor, local controllers connected to defined clusters of the battery cells, and a master controller. The system further comprises at least one processor and at least one memory that stores executable instructions that, when executed by the at least one processor, facilitate performance of operations. The operations comprise receiving, by the local controllers from the master controller, master control information determined by the master controller based on actual phase current values of the respective phase currents. The operations further comprise determining, by the local controllers, local control information based on the master control information and estimated phase current values for the respective phase currents, and controlling, by the local controllers, current output by the battery cells to the electric motor in accordance with the master control information or the local control information based on whether a difference is observed between the master control information and the local control information.

Another embodiment can include a computer-implemented method for controlling an electric motor of an electric vehicle. The computer-implemented method can comprise supplying power to the electric motor via a smartcell battery system comprising a plurality of battery cells arranged in three strings that provide respective phase currents of a three-phrase current used to drive the electric motor, local controllers connected to defined clusters of the battery cells, and a master controller. The computer-implemented method can further comprise receiving, by the local controllers from the master controller, master control information determined by the master controller based on actual phase current values of the respective phase currents, the master control information comprising a reference voltage value indicating an amount of voltage needed for provision to the electric motor to achieve a requested operating speed and torque. The computer-implemented method can further comprise determining, by the local controllers using respective processors, local control information based on the master control information and estimated phase current values for the respective phase currents, the local control information comprising an estimated voltage value for the amount of voltage needed, and controlling, by the local controllers, current output by the battery cells to the electric motor in accordance with the reference voltage value or the estimated voltage value based on whether a difference is observed between the reference voltage value and the estimated voltage value.

Another embodiment can include a computer program product that facilitates controlling an electric motor of an electric vehicle powered by a smartcell battery system, the smartcell battery system comprising: a plurality of battery cells arranged in three strings that provide respective phase currents of a three-phrase current used to drive the electric motor; local controllers connected to defined clusters of the battery cells; and a master controller. The computer program product can comprise a non-transitory computer readable medium having program instructions embodied therewith, the program instructions executable by respective processors of the local controllers to cause the respective processors to: receive master control information determined by the master controller based on actual phase current values of the respective phase currents, the master control information comprising a reference voltage value indicating an amount of voltage needed for provision to the electric motor to achieve a requested operating speed and torque; determine local control information based on the master control information and estimated phase current values for the respective phase currents, the local control information comprising an estimated voltage value for the amount of voltage needed; and control current output by the battery cells to the electric motor in accordance with the reference voltage value or the estimated voltage value based on whether a difference is observed between the reference voltage value and the estimated voltage value.

DESCRIPTION OF THE DRAWINGS

One or more exemplary embodiments are described below in the Detailed Description section with reference to the following drawings.

DETAILED DESCRIPTION

Figure 1:
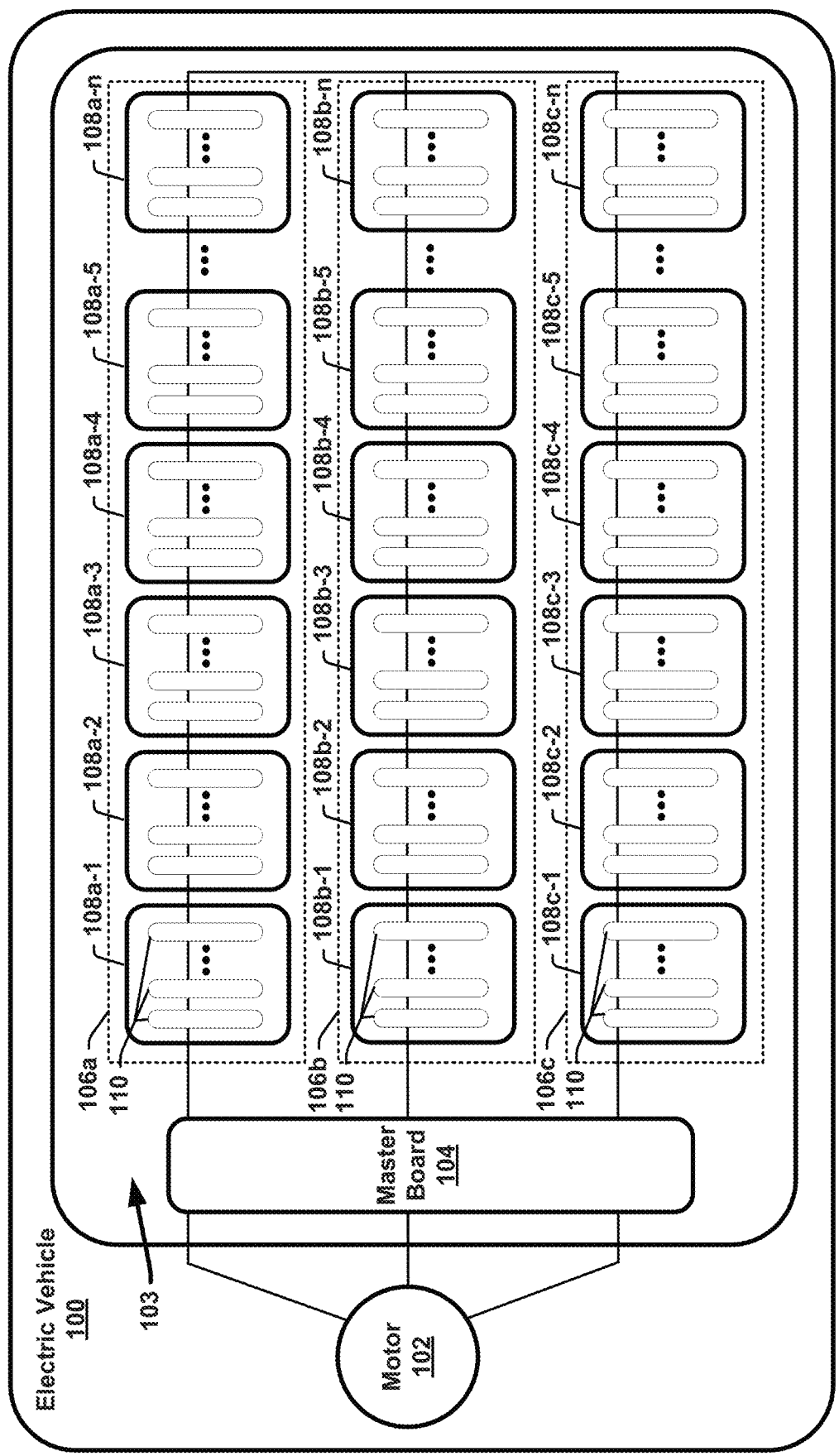
FIG. 1 illustrates a schematic top view of a smartcell battery system for driving an electric motor of an electric vehicle in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

In one or more embodiments described herein, systems, computer-implemented methods, and/or computer program products that can facilitate optimizing control of motor current at high speeds in a distributed inverter system. As used herein, a distributed inverter system refers to a smartcell battery system. A smartcell battery system aims to remove large and costly parts from a conventional drivetrain and use the batteries more efficiently. More particularly, a smartcell battery system is a multilevel inverter concept that aims to replace driveline components such as the conventional large inverter by integrating them into printed circuit boards (PCBs) connected to clusters of battery cells. These PCBs are connected wirelessly to a central controller that handles high level control. These PCBs include local wireless communication hardware, processing units, memory, modulators, switches and other electronic elements that enable them intelligently control and manage operations of the respective battery cells to which they are connected (e.g., rendering them "smart"). Further the PCBs enable the direct current (DC) output from a small battery cluster to be converted into an alternating current (AC) to control an electric motor through field-oriented control (FOC). Through changing the inverter switching to a smartcell system, the battery back can operate at double the voltage level of similar battery backs using a conventional inverter, resulting in a lower current with less losses. Further only the batteries needed are activated instead of all batteries needing to be constantly active, thereby increasing efficiency.

However, the smartcell battery system introduces new constraints on motor control. In particular, the smartcell battery system uses a centralized controller that controls the output current of the battery cells via communicating control signals between the central controller and the respective PCBs connected to the battery cells using a wireless control protocol. The update rate of control signal is constrained by the maximum transmission rate of the wireless communication protocol, which in current implementation is 1.0 kilohertz (kHz), which translates to a maximum update rate of about one control signal every 1.0 millisecond (ms) (e.g., a 1 ms update rate). During some drive cases, the motor current must be updated with an even higher rate to minimize drivetrain oscillations, improve comfort and ensure safe operation. For example, the maximum update rate of 1 kHz may not be fast enough to catch some disturbances that might occur a high speeds (e.g., relative to the speed and torque at which the motor enters field-weakening) such as the motor unexpectedly reducing or increasing torque.

To solve the 1 kHz update rate, the disclosed techniques introduce a local control protocol performed by local controllers on the respective PCBs. The local control protocol introduces a local control loop with an update frequency corresponding to a transmission rate of about 10 kHz (e.g., which translates to an update rate of about 1.0 control message every 1.0 microsecond (u)) in addition to the main 1 kHz control loop to detect and minimize disturbances in the motor operation.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling.

FIG. 1 illustrates a schematic top view of a smartcell battery system 103 for driving an electric motor (motor 102) of an electric vehicle 100 (hereinafter, vehicle 100) in accordance with one or more embodiments described herein. In FIG. 1, the connection(s) between the smartcell battery system 103 and the motor 102 (are) indicated by solid lines. The smartcell battery system 103 is configured to provide electric energy to the motor 102 to drive the electric vehicle 100.

In this regard, the motor 102 can include or correspond to a three-phase electric motor such as a permanent magnetic synchronous motor (PMSM), which is, for example, part the vehicle's powertrain or drive. A PMSM is a synchronous machine that uses permanent magnets (PM) to generate a magnetic field instead of electromagnetic windings. The three-phase machine operates using a three-phase current system. The fundamental frequency of the supplying three-phase system also decides the rotor speed by controlling the rotating magneto-motive force (MMF). Together with the field of the PM rotor, the MMF generates the torque.

The rotor consists of the PM and three static coils are the stator windings. The stator windings are distributed 120° apart from the PM in the center. The stator windings can be represented as an inductance in series with a resistance. The three windings are described as phase A, phase B, and phase C with the phase currents $i_a$, $i_b$ and $i_c$. When the current runs through the static coils a magnetic field is generated according to Faraday's law, and a magnetic field is generated by the PM. When the electrical angle between the MMF of the stator and the rotor field is 90°, the maximum torque is generated.

In conventional systems, the three-phase current is generated from a DC power supply by an inverter. In accordance with the disclosed techniques, the three-phase current is generated from the smartcell battery system 103 without the use of an inverter. To facilitate this end, the smartcell battery system 103 comprises a plurality of battery cells 110 arranged in three separate strings that provide respective phase currents of a three-phrase current used to drive the motor 102 (i.e., each string forms one phase when connected to the motor 102). The three separate strings are indicated in FIG. 1 as string 106a, string 106b, and string 106c. The battery cells 110 associated with each string are connected in series. The three phases are respectively referred to herein as phase A, generated by string 106a, phase B generated by string 106b and phase C generated by string 106c.

The number of battery cells 110 included in each sting can be tailored to reach a desired maximum voltage level (e.g., 400 Voltz (V), 800V, or another desired voltage level). The amount of DC voltage supplied by each battery cell 110 can be the same or different. In some embodiments, the amount of DC voltage supplied by each battery cell 110 is about 3.7V, however various other configurations are envisioned. The battery cells 110 can respectively comprise any type of battery cell material such as, for instance, a lithium battery cell material, a lithium ion (Li-Ion) battery cell material, a lithium metal battery cell material, a lithium sulphur (Li—S) battery cell material, a molten salt (Na—NiCl2) battery cell material, a nickel metal hydride (Ni-MH) battery cell material, a lead acid battery cell material, and/or another type of battery cell material.

The battery cells 110 within each string are further grouped into clusters comprising two or more battery cells, wherein each battery cell cluster is connected to and independently controlled by a separate cluster board. Clustering cells can also allow bigger steps in voltage to be obtained on a sine wave. For example, an H-bridge can cluster a plurality of battery cells 110 to form a battery cell cluster. A plurality of the battery cell clusters can be connected in series via busbars, and the plurality of battery cell clusters can be connected in series can form one string of clusters that can produce one phase of a three-phase current.

The cluster boards are indicated in FIG. 1 as cluster boards 108a-1 to 108a-n, cluster boards 108b-1 to 108b-n, and cluster boards 108c-1 to 108c-n, wherein "n" indicates the number of cluster boards included in each string, which can vary and be scaled as desired, and wherein the letters "a," "b," and "c" are used to indicated the specific series or phase to which each cluster board belongs. In some embodiments, the number "n" of cluster boards associated with each string can range between about 50 to about 100 (e.g., in one implementation n=96), although various other configurations are envisioned. It should be appreciated that although each cluster board (generally referred to a cluster board 108) is illustrated with three or more battery cells 110, it should be appreciated that each cluster board 108 can be connected to two or more battery cells 110. In some embodiments, the number of battery cells 110 connected to each cluster board can range from two to eight battery cells 110. Various configurations are envisioned.

In this regard, each cluster board 108 is connected to and controls a subset of battery cells 110 associated with the same string. The cluster boards 108 can include or correspond to circuit boards, or more particularly printed circuit boards (PCBs). Each cluster board 108 can include electronic hardware and software components that enable each cluster board 108 to intelligently control operation of the respective battery cells 110 connected thereto. The electronic hardware and software components can include, but are not limited to, a processor, a memory, a wireless communication component (e.g., a transceiver or the like), a local controller, a modulator, a DC/DC converter, one or more electronic switches (e.g., field effect transistors (FETs), metal oxide field effect transistors (MOFETs), etc., and one or more sensors.

In this regard, each cluster board 108 can electrically control the switching on and off the respective battery cells 110 connected thereto to generate a desired output voltage. For example, the cluster of battery cells 110 connected to a single cluster board 108 can be connected via respective H-bridge circuits and the cluster board 108 can control connecting and disconnecting the respective battery cells in different combinations to generate different output voltage modes of the battery cell cluster, namely a bypass mode, a positive voltage output mode and a negative voltage output mode. For example, using a modulator, each cluster board 108 can control closing (or disconnecting) and opening (or connecting) contactors (e.g., FETs, MOSFETS, or another type of contactor) of the battery cells 110 such that the collective output of the battery cells in the cluster is a negative voltage, a positive voltage, or a bypass mode.

With this configuration, the DC output current of respective battery cells 110 of each string can be selectively controlled (switched on and off) in a manner such that the output current of each string (of the three strings 106a, 106b, and 106c) produces a sinusoidal wave corresponding to an alternating current (AC), wherein both positive and negative polarities can be used. A pulse width modulation (PWM) control scheme is utilized at the engagement and disengagement for the DC cluster smoothing the 90° steps into a curved form. For example, by connecting a plurality of battery cell clusters in series to form a string (e.g., one string of string 106a, string 106b and string 106c) and controlling the positive and negative output currents of the respective battery cells in the same series or string, a sine shaped wave from can be generated, wherein the sine shaped wave form can be a representation of an AC current generated by the string of battery cell clusters, wherein each cluster can generate one voltage step in the sine wave. Because the cluster boards 108 and their respective battery cells 110 are connected in three different strings, together they can generate a three-phase sine wave voltage output (e.g., a three-phase AC current), which can run a three-phase motor (e.g., motor 102, corresponding to a PMSM or another type of a three-phase electric motor). In this regard, the voltage output can be controlled to achieve desired phase currents (torque) for controlling the motor 102.

The smartcell battery system 103 is designed with individual local controllers at each cluster board 108 that communicate wirelessly with a main or master controller provided at a master board 104. In this regard, the master board 104 (or more particular the master controller at the master board 104) and the cluster boards 108 (or more specifically the local controller at the respective cluster boards 108) are configured to communicate wirelessly with one another using an existing wireless communication protocol. The individual local controllers interpret the orders from the main controller and engage the battery cells 110 accordingly.

Figure 2:
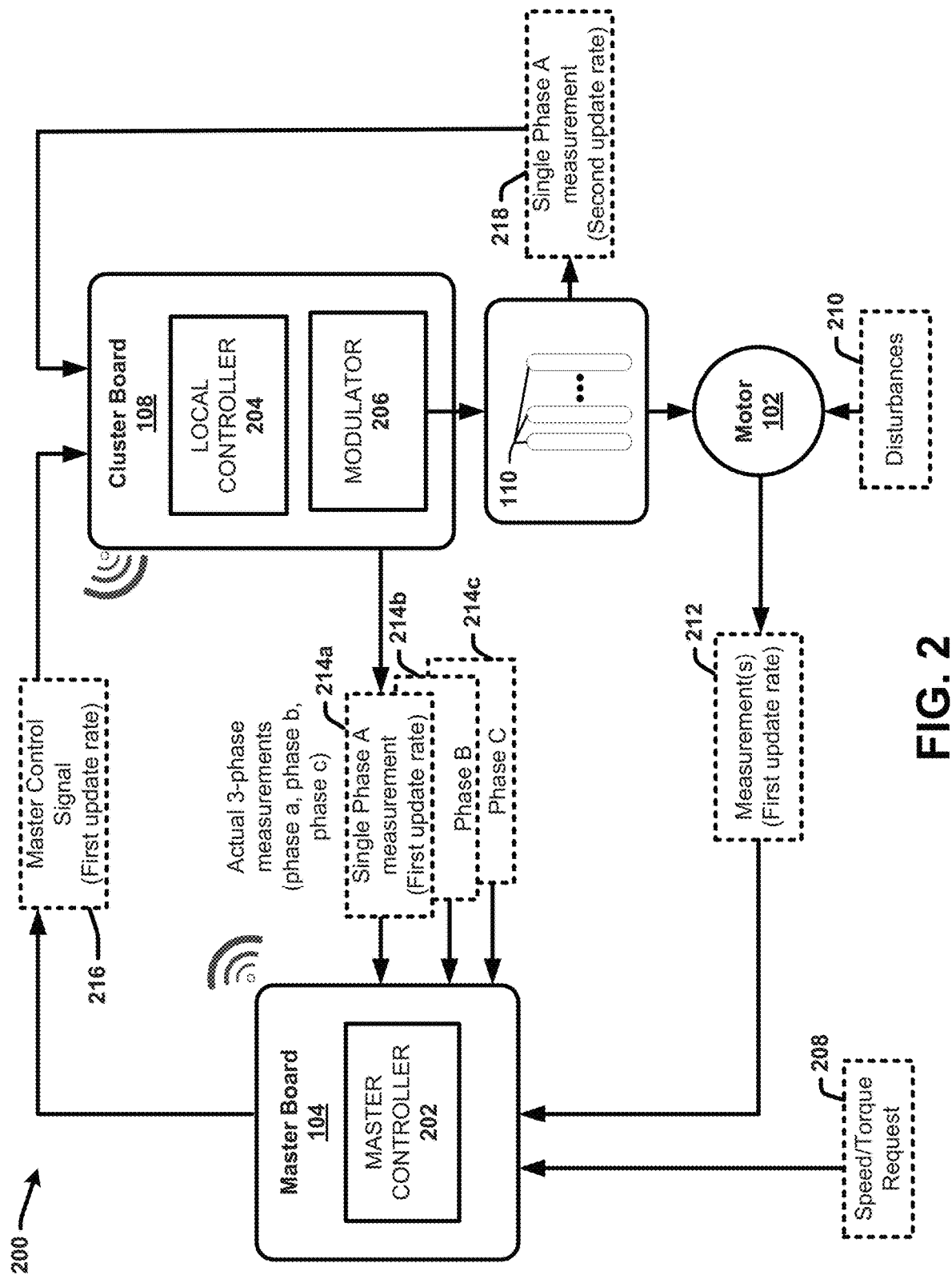
FIG. 2 illustrates an example control system for controlling an electric motor of an electric vehicle that employs a smartcell battery system in accordance with one or more embodiments described herein.

FIG. 2 illustrates an example control system 200 for controlling an electric motor (motor 102) of an electric vehicle 100 that employs a smartcell battery system (e.g., smartcell battery system 103) in accordance with one or more embodiments described herein. With reference to FIGS. 1 and 2, as illustrated in FIG. 1, the master board 104 can include a master controller 202 that determines and transmits a master control signal 216 to the respective cluster boards 108. In FIG. 2, a single cluster board 108 is illustrated for exemplary purposes to demonstrate the control relationship between the master board 104 and an individual cluster board 108 associated with a single phase or string (of strings 106a, 106b, and 106c). It should be appreciated however that the master board 104 transmits or broadcasts the master control signal 216 to all or a selected subset of the cluster boards 108a, 1-*n*. 108b, 1-*n* and 108c. 1-*n* of the smartcell battery system 103 simultaneously, and that the same operations performed by the cluster board 108 as described herein are also simultaneously performed by the other cluster boards.

The master control signal 216 includes control information that dictates how the cluster boards 108 are to operate their respective battery cells 110 (i.e., their battery cell clusters) to generate a desired output voltage to achieve a desired torque of the motor 102 to satisfy a current speed request/torque 208 of the motor (e.g., a current requested speed by the driver of the vehicle 100). As shown in FIG. 2, each of the cluster boards 108 can include a local controller 204 and a modulator 206 (among other electronic components, not shown). In one or more embodiments, the master control signal 216 comprises a required voltage value determined by the master controller 202 that indicates the required voltage needed for supplying to the motor 102 to a achieve the requested speed. In accordance with previous control strategies, the local controller 204 can be configured to provide the received required voltage value to the modulator 204 which in turn controls the output voltage of the battery cells 110 as needed to generate the required voltage value by switching the battery cells 110 on and/or off.

The master controller 202 can determine the required voltage value because the master board 104 is connected to the motor 102 (e.g., directly and/or indirectly) and can obtain the current and requested operating parameters (e.g., measurements 212) of the motor needed to compute the required voltage value (as discussed in greater detail infra). The master board 104 is further wirelessly connected to each of the cluster boards 108 which are configured to regularly measure and transmit various relevant operating parameters associated with the respective battery clusters that they are connected to master controller 202. The master controller 202 can also use the current operating parameters of the respective battery clusters to accurately determine the required voltage, among other control instructions (e.g., cluster utilization priority, DC/DC set points, and others).

Of particular importance with respect to determining the required voltage is the phase current measurement of each phase of the three-phase currents being currently generated by the respective strings 106a, 106b and 106c to which each cluster board 108 is associated with. In this regard, on each cluster board 108, there is a measurement component (e.g., measurement component 408, comprising one or more sensors) which measures the phase current of the phase that the cluster board 108 is located on. Each local controller 204 of each cluster board 108 is further configured to measure and report (e.g., wirelessly transmit) the current phase measurement to the master controller 202 according to a defined schedule. For example, assuming cluster board 108 as shown in FIG. 2 is located on string 106a, cluster board 108 provides a single phase measurement 214a for phase A, indicating the measured current of phase A corresponding to string 106a to which the cluster board 108 is connected. Similarly, the cluster boards 108 of the other two strings 106b and 106c also report their corresponding phase current measurements (e.g., the measured current of phase B, measurement 214b, and the measured current of phase C, measurement 214c). The phase measurements provided by two or more cluster boards belonging to the same phase will be the same (e.g., as they each measure the same phase current output). The collective single phases measurements 214a, 214b and 214c for all three phases A, B and C reported to the master controller 202 by the collective cluster boards 108 are referred to herein as "actual three-phase measurements," (as opposed to "estimated three-phase measurements, as discussed in greater detail below).

In accordance with various embodiments, the defined schedule with which the respective cluster boards report the actual three-phases measurements is based on the maximum data transmission rate of the wireless communication protocol employed by the master board 104 and the respective cluster boards 108 to communicate. The maximum transmission rate also controls the frequency or rate at which the master controller 202 can transmit the master control signal 216 that accounts for the current demands on the motor 102 and the current operating parameters of the motor 102 and the smartcell battery system 103 over the course of operation of the vehicle 100. In this regard, it should be appreciated that in accordance with one or more embodiment of control system 200, the master controller 202 and the cluster boards 108 operate on a continuous control loop, wherein the master controller 202 receives updated actual three-phase measurements from the cluster boards 108 according to a defined update frequency/rate (referred to herein and indicated in FIG. 2 as "first update rate"), and determines and transmits an updated master control signal 216 to the cluster boards 108 based on the updated actual three-phase measurements according to the defined update frequency/rate. The cluster boards 108 in turn receive the updated master control signal 216 and control the output voltage of the battery cells 110 based on the updated master control signal 216 according to the defined update rate, wherein the defined update frequency/rate is controlled based on the maximum transmission rate of the wireless communication protocol. This control loop between the master controller 202 and the local controllers 204 is referred to herein as the "main control loop."

In various embodiments, the maximum transmission rate or update rate or the wireless communication protocol is about 1 kHz, which translates into an update rate of about every 1 millisecond (ms). However, at high speeds (e.g., speeds exceeding about 30 mph), the motor 102 can be exposed to disturbances 210 that can occur at a higher rate than 1 kHz, such as the motor 102 unexpectedly reducing or increasing torque. Therefore, a faster local control loop is necessary to ensure safe operation of the vehicle 100. To facilitate this end, the disclosed techniques introduce a local control loop into the control system 200 in addition to the main control loop described above. In accordance with the local control loop, the local controllers (e.g., local controller 204) of each cluster board 108 are configured to obtain (e.g., using their corresponding measurement components 408) their single phase measurements at a significantly higher update rate relative to that employed by the main control loop (referred to herein and indicated in FIG. 2 as "second update rate"). In various embodiments, the local control loop can employ a local update rate of about every 1.0 microsecond (1.0 μs), which translates to a transmission frequency of about 10 kHz. For example, the local controller 204 can be configured to direct the measurement component (e.g., measurement component 408) to measure the single phase current value for the phase to which the cluster board 108 belongs at a 10 kHhz update rate, represented in FIG. 2 as single phase measurement 218 for phase A, taken at the second update rate (assuming in this example cluster board 108 belongs to phase A, string 106a). In other embodiments, the update rate of the local control loop can be any update rate that is higher than the update rate employed by the main control loop (e.g., the second update rate can be any update rate that is higher than the first update rate). The local controller 204 can further be configured to estimate the other two phase current outputs (e.g., phase B and phase C in this example) using the measured current for its phase and three-phase estimation process (described in greater detail below). Then using the three-phase current measurements (e.g., one actual, two estimated), the local controller 204 can be configured to mirror the function of the master controller 202 with respect to determining an updated version of the master control signal locally, yet at the faster update rate (e.g., 10 kHz or every 1.0 µs). In this regard, the local controller 204 can determine an estimated required voltage value at a higher update rate based on the three-phase estimation in between each reception of the master control signal 216 (e.g., received at an update rate of 1 kHz). The local controller 204 can further be configured to direct the modulator 206 to apply the estimated required voltage value in between reception of the master control signal 216 if the estimated required voltage value differs from the last received required voltage value included in the master control signal 216.

In this manner, an estimated state of the three-phase system is used to generate a local control signal that can aid the motor control. In other words, the local control loop uses the master controller required voltage value as a reference point, which has a more accurate view of the vehicle systems (e.g., the motor 102, the smartcell battery system 103, and additional systems of the vehicle). In this regard, due to the local three-phase prediction, the local controllers (e.g., local controller 204) enable the cluster boards 108 to control and correct the vehicles' systems transient behavior between updates from the master controller 202. Additional details regarding the main control loop and the local control loop are further discussed below with reference to FIG. 3.

Figure 3:
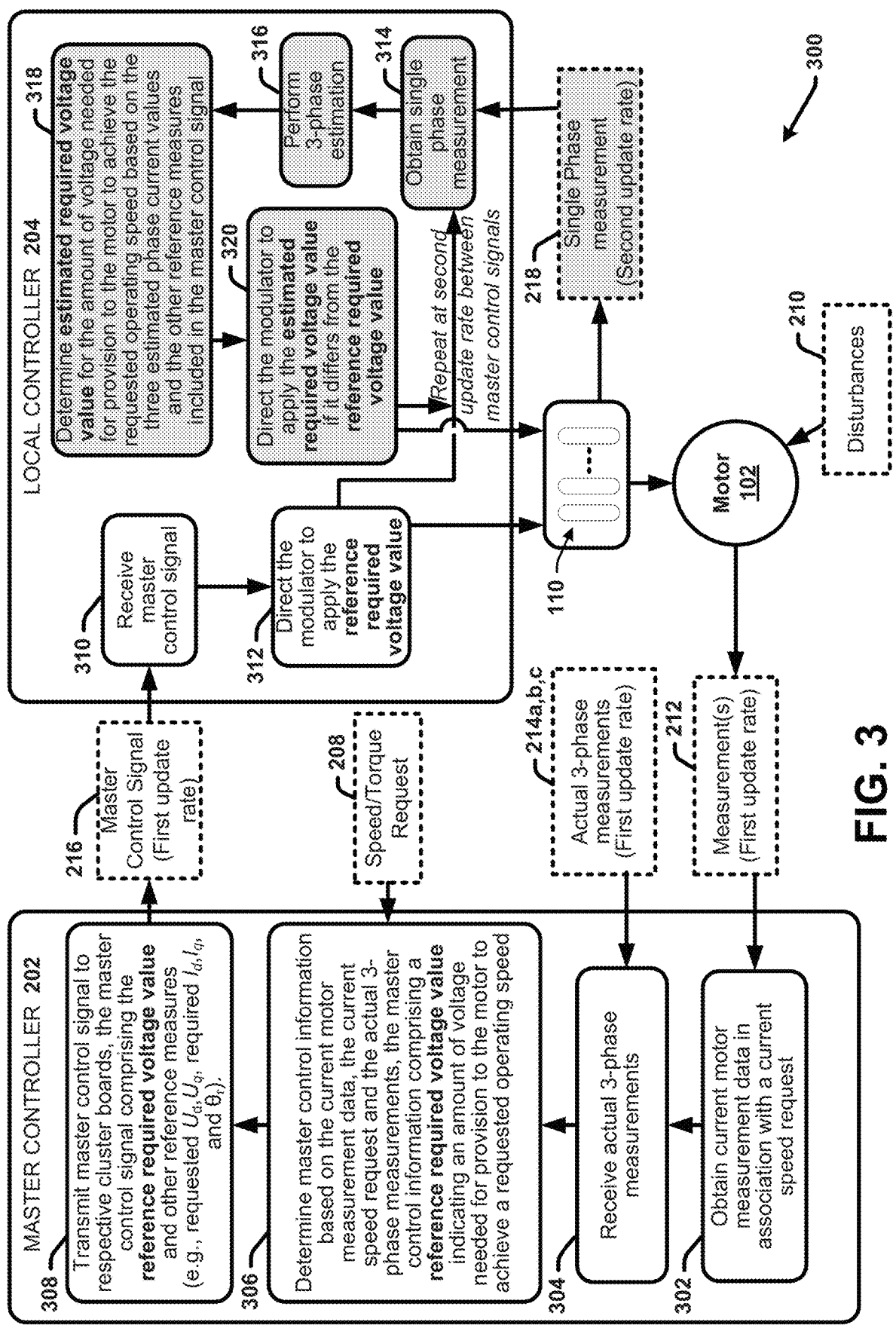
FIG. 3 illustrates a flow diagram of an example process for controlling an electric motor of an electric vehicle that employs a smartcell battery system in accordance with one or more embodiments described herein.

FIG. 3 illustrates a flow diagram of an example process 300 for controlling an electric motor (e.g., motor 102) of an electric vehicle (e.g., vehicle 100) that employs a smartcell battery system (e.g., smartcell battery system 103) in accordance with one or more embodiments described herein. In accordance with process 300, the master controller 202 and the local controller 204 can perform the main control loop described above, and the local controllers of the respective cluster boards 108 can further perform a local control loop described above. As with FIG. 2, although FIG. 3 illustrates a single local controller 204, it should be appreciated that each cluster board 108 of the smartcell battery system 103 includes the local controller 204 that performs the same operations described with respect to its corresponding phase of the three-phase system. Elements of process 300 corresponding to the local control loop, are indicated with gray fill while elements of process 300 corresponding to the main control loop are indicated with white fill. In accordance with process 300, over the course of operation of the vehicle 100, the main control loop can be continuously performed at first update rate (meaning that it is iteratively performed in accordance with the first update rate) and the local control loop can be continuously performed at a second update rate (meaning that it is iteratively performed in accordance with the second update rate), wherein the second update rate is faster than the first update rate. In various embodiments, the first update rate is about every 1.0 ms (e.g., corresponding to a transmission rate of about 1 kHz) and the second update rate is about every 1.0 µs (e.g., corresponding to a transmission rate of about 10 kHz). Repetitive description of like elements employed in respective embodiments is omitted for sake of brevity.

With reference to FIG. 3 in view of FIGS. 1 and 2, in accordance with process 300 and the main control loop, at 302, the master controller 202 can obtain (e.g., at the first update rate) current motor measurement data (e.g., measurements 212) for the motor 102 in association with a current speed/torque request 208. The current speed/torque request 208 corresponds to a signal received from the driver of the vehicle 100 indicating a desired speed for operating the vehicle 100. As described in greater detail below, at 306, the master controller 202 converts the speed request into a torque request that corresponds to an amount of torque needed to accelerate or decelerate to reach the requested speed given the present speed of the vehicle 100. Accordingly, the measurements 212 can include or correspond to a currently requested speed for operating the vehicle 100 and the current speed of the vehicle. The measurements 212 can also include the electrical angle of the rotor ($\theta_r$). At 304, the master controller receives the actual three-phases measurements 214a,b,c from the respective cluster boards 108 via the wireless communication protocol (e.g., at the first update rate); that is the measured current for phase A ($i_a$ measured), the measured current for phase B ($i_b$ measured), and the measured current for phase C ($i_c$ measured).

At 306, the master controller 202 determines master control information based on the current motor measurement data (e.g., measurement 212), the current speed request and the actual three-phase measurements 214a,b,c, the master control information comprising a reference required voltage value (ref. $U_{required}$) indicating an amount of voltage needed for provision to the motor 102 to achieve a requested operating speed. In association with determining the master control information at 306, the master controller 202 can also determine the requested voltage in the dq-frame (requested $U_d, U_q$) and the required current in the dq-frame (required $i_d, i_q$), as described below.

In this regard, the actual three-phase measurements 214a,b,c are received as three separate phase measurements $i_a$, $i_b$, and $i_c$, which are sinusoidal reference signals. As noted above with reference to FIG. 1, in various embodiments, the motor 102 corresponds to a PMSM. One control strategy used to control the speed and torque of such a motor is known as field-oriented control (FOC). The main objective of FOC is to decouple the control of torque and flux within the motor, allowing precise and efficient control of the motor performance. The control of the regulators in the FOC model is greatly simplified with operating DC quantities, rather than sinusoidal reference signals.

The motor magnetic field is represented in the two-dimensional, rotating, dq-coordinate system. The d-axis is aligned with the magnetic field generated by the PMs, and the q-axis is perpendicular to the d-axis. The q-axis current is proportional to the torque generated by the motor, and the d-axis current is proportional to the magnetic field. When operating in the dq-frame and controlling the d- and q-axis currents, the magnetic field and torque of the motor can be controlled independently.

To be able to implement FOC the instantaneous values of the currents and voltages are required. Therefore, the dynamic expressions of the three-phase currents $i_a$, $i_b$, and $i_c$ need to be expressed in a rotating reference frame, the dq-frame. This is excavated through Clarke and Park transformations. The Clarke transformation results in a two-phase orthogonal αβ-frame, with the currents iα and iβ. The two-phase currents are derived from the three-phase currents using Equation 1, wherein C is a constant and can either be power invariant or amplitude invariant. In one or more embodiments, the amplitude invariant C-value is used (e.g., C=⅔).

$$\begin{bmatrix} i_\alpha \\ i_\beta \end{bmatrix} = C \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_a \\ i_b \\ i_c \end{bmatrix}. \quad \text{Equation 1(Clark Transformation)}$$

The Park transformation uses the two-phase orthogonal current iα and iβ to calculate $i_d$ and $i_q$ using Equation 2, wherein $i_d$ and $i_q$ are static current components in the dq-frame aligned with the rotor flux, and wherein θ is the rotor angle.

$$\begin{bmatrix} i_d \\ i_q \end{bmatrix} = \begin{bmatrix} \cos(\theta) & \sin(\theta) \\ -\sin(\theta) & \cos(\theta) \end{bmatrix} \begin{bmatrix} i_\alpha \\ i_\beta \end{bmatrix}. \quad \text{Equation 2(Park Transformation)}$$

Further, $i_d$ and $i_q$ can be used to calculate the electromagnetic torque, $T_{em}$ of the motor 102 using Equation 3, wherein Ψd and Ψq are the d- and q-axis flux linkages, Ψr is the flux linkage of rotor excitation flux through the stator winding, and p is the number of pole pairs.

$$T_{em} = \frac{3p}{2} C(\psi_d i_q - \psi_q i_d) = \psi_r i_q. \quad \text{Equation 3}$$

In this regard, in one or more embodiments, at 306 the master controller 202 takes the current speed/torque request 208 indicating a desired speed for operating the vehicle 100 and converts the speed request into a torque request that corresponds to an amount of torque needed to accelerate or decelerate to reach the requested speed given the present speed of the vehicle 100. In one or more embodiments, the master controller 202 can use a speed controller such as a proportional-integral (PI)-controller or a proportional-integral-derivative (PID) to determine the torque needed based on the current speed and the requested speed (e.g., included in the measurements 212). The speed controller can employ one or more defined transformation functions to determine the torque needed based on the current speed and the requested speed with coefficients defined to enable a conversion from the speed difference into a torque request based on defined motor parameters for the motor 102 (e.g., derived from testing of the motor).

The master controller 202 further uses a look-up table or a similar data structure to facilitate converting the requested torque into an equivalent voltage level in the dq-frame for the motor 102 to run at the requested speed, that is the requested voltage $U_d, U_q$. The master controller 202 further converts the requested voltage $U_d, U_q$ into the required current in the dq-frame that is required to achieve the requested voltage, that is required current $I_d, I_q$. The master controller 202 further converts the actual three-phase current measurements $i_a$, $i_b$, and $i_c$, into the dq-frame to obtain the actual measured current $i_d$, $i_q$ using the Clarke and Park transformations described above. The master controller 202 further compares the measured current $i_d$, $i_q$ with the required current $I_d, I_q$ to determine the required voltage (ref.

$U_{required}$) based on the difference between the measured current $i_d$, $i_q$ and the required current $I_d, I_q$. The required voltage (ref. $U_{required}$) can also be expressed in the dq-frame (e.g., (ref. $Ud_{required}$ and $Uq_{required}$). The master controller 202 determines the master control information at the first update rate.

At 308, the master controller transmits the master control signal 216 to the respective cluster boards 108 (e.g., at the first update rate). The master control signal 216 can comprise the reference required voltage value (ref. $U_{required}$) and other reference measures. In one or more embodiments, in addition to (or alternative to) the reference required voltage value (ref. $U_{required}$), the master control signal 216 includes the requested voltage $U_d, U_q$, the required current $I_d, I_q$, and the angle of the rotor, θr.

At 310, the local controller 204 receives the master control signal (e.g., at the first update rate). In accordance with the main control loop, in one or more embodiments, in response to initial reception of the master control signal, the local controller 204 can be configured to pass the master control signal to the modulator 206 and at 312, direct the modulator to apply the reference required voltage value determined by the master controller (ref. $U_{required}$, or more specifically (ref. $Ud_{required}$ and $Uq_{required}$). For example, upon immediate reception of the master control signal, the $U_{required}$ value generated by the master controller provides an accurate measurement based on the instantaneous state of the system at the time at which the master control signal is received. Owing to the transmission delay, disturbances 210 may be observed during the small window of time (e.g., about 1.0 ms) following reception of the master control signal and the subsequently updated master control signal. To account for such disturbances 210 between reception of the master control signal 216, after initially directing the modulator to apply the reference required voltage value at 312, the local controller 204 can be configured to execute the local control loop and determine one or more estimated required voltage values (e.g., the number of which depends on the second update rate) that account for any observed disturbances 210. The local controller 204 can further be configured to direct the modulator 204 to apply the estimated required voltage value if it different from the reference required voltage value until the next master control signal is received.

In this regard, with reference to the local control loop, at 314 the local controller 204 can obtain the single phase current measurement for the phase that the battery cell cluster controlled by the local controller 204 is located on (e.g., using measurement component 408). In particular, the local controller 204 measures the actual single phase current value for the phase of the string (of strings 106a, 106b and 106c) to which the local controller 204 is connected by measuring the actual single phase current value of the battery cluster controlled by the local controller 204. At 316, the local controller 204 further estimates the phase current values for the other two phases of the other two strings to which the local controller 204 is disconnected using a three-phase estimation process. This three-phase estimation process is described in greater detail infra.

At 318, the local controller 204 determines an estimated required voltage value (est. $U_{required}$) for the amount of voltage needed for provision to the motor 102 to achieve the requested operating speed based on the estimated phase current values (e.g., estimated $i_a$, $i_b$ and $i_c$), and the other reference measures included in the master control signal 216 (e.g., the requested voltage $U_d, U_q$, and the required current $I_d, I_q$). For case of description, all three of the phase current values used by the local controller 204 at 318 are collectively referred to as estimated three-phase current values (e.g., estimated $i_a$, $i_b$ and $i_c$), although it should be appreciated that one will be an actual measurement and the other two will be estimated. In this regard, at 318, the local controller 204 can determine the estimated required voltage value (est. $U_{required}$) based on the estimated three-phase current values (e.g., estimated $i_a$, $i_b$ and $i_c$) and the other reference measures (e.g., the requested voltage $U_d$,$U_q$ and the required current $I_d$,$I_q$) using a same or similar process employed by the master controller 202 at 306 to determine the reference required voltage value (ref. $U_{required}$). For example, the local controller 204 can convert the estimated three-phase current values (e.g., estimated current $i_a$, in and $i_c$) into the dq-frame using the Clark and Park transformations to obtain estimated current $i_d$ and $i_q$ values. The local controller 204 can further compare the estimated current $i_d$, $i_q$ with the required current $I_d$,$I_q$ measurements received in the master control signal 216 at 310 to determine the estimated required voltage (est. $U_{required}$) based on the difference between the estimated current $i_d$, $i_q$ and the required current $I_d$,$I_q$. The estimated required voltage (est. $U_{required}$) can also be expressed in the dq-frame.

At 320, the local controller 204 can further compare the estimated required voltage (est. $U_{required}$) with the reference required voltage (ref. $U_{required}$) received in the master control signal 216 and direct the modulator 204 to apply the local control signal, that is the estimated required voltage (est. $U_{required}$) if it differs from the reference required voltage (ref. $U_{required}$) at all and/or beyond a defined threshold amount. In this manner, faster motor control is achieved due to the local prediction enabling the cluster boards 108 to control and correct the system transient behavior between updates from the master controller.

In accordance with both the master control and the local control loop, at 312 or 320 respectively, the local controllers 204 direct their respective modulators 206 to apply a determined required voltage value to control the output current of their corresponding battery cell clusters. In this regard, each of the modulators 206 intelligently engage and disengage their respective battery cells 110 of their respective battery clusters to generate a sinusoidal output wave for their corresponding phase using PWM. Each of the modulators 206 control a cluster of battery cells 110, wherein each cluster of battery cells can contribute a portion of the collective voltage amount needed to achieve the required voltage value. For example, assume one each battery cluster comprises four battery cells each providing a voltage of about 3.75 V, and thus the total maximum voltage provided each cluster is about 15 V. Each of the modulators further operate their respective battery cell clusters according to predefined priority information that controls the order in which the respective battery clusters are used in series on the respective strings 106a, 106b and 106c until the aggregated output voltage meets the demanded voltage (e.g., the determined required voltage). The priority information can be fixed, dynamic, determined by the master controller 202 and/or by the local controllers 204, based on current cell state of charge (SoC), and various other monitored parameters associated with the battery cells (e.g., temperature; pressure (e.g., swelling); chemistry (e.g., chemistry on electrolyte to monitor aging); acceleration (e.g., to sense a crash of, for instance, an electric vehicle comprising device); current (e.g., current flowing into and/or out of device and/or active cell material); voltage (e.g., voltage potential across cell material poles of active cell material); and/or other parameter data of the device and/or active cell material).

In this regard, each modulator 206 works by using the control signal that has been transformed back from the dq-frame (e.g., $U_{required}$ expressed in the dq-frame) into sinusoidal form as the three different phases. This wave corresponds to the level of the entire phase but needs to be split into the range within which the cluster should operate. These operating levels corresponds to the total state of charge (SoC) level of a single cluster meaning that different clusters can have different resolutions. With the output of the modulators 204, control signals for each switch in each H-bridge controls the output of each cluster according to the modulator's 204 calculations.

Figure 4:
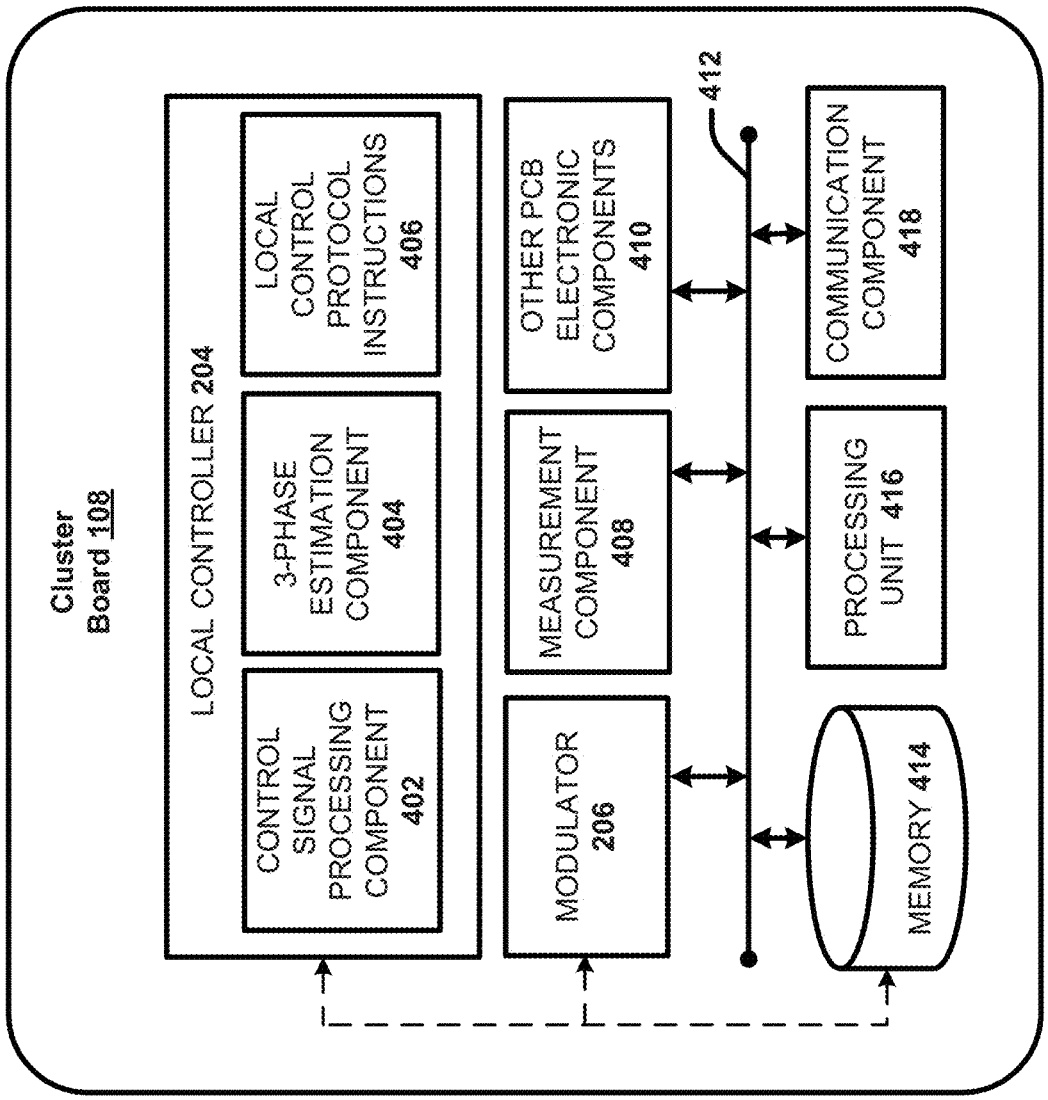
FIG. 4 illustrates a high-level block diagram of an example cluster board in accordance with one or more embodiments described herein.

FIG. 4 illustrates a high-level block diagram of an example cluster board 108 in accordance with one or more embodiments described herein. With reference to FIGS. 1-3 in view of FIG. 4, the example cluster board 108 can correspond to each of the cluster boards 108a-n, 108b-n, and 108c-n of the smartcell battery system 103. In this regard, it should be appreciated the cluster board 108 is connected (e.g., physically and operatively coupled) to a defined battery cell cluster comprising two or more battery cells 110 located on the same string or phase. In various embodiments, the cluster board 108 can include or correspond to a PCB that is physically and operatively coupled to the two or more battery cells 110 of the cluster. The cluster board 108 can comprise both electronic hardware and software components that enable the cluster board 108 to intelligently control the operating states of the battery cells 110 to which it is connected in accordance with the motor control mechanisms described herein.

For example, the cluster board 108 can include at least one memory 414 that stores machine and/or computer-executable components or instructions, and at least one processor (e.g., processing unit 416, a central processing unit (CPU), a microprocessor, etc.) that executes the computer-executable components/instructions stored in the at least one memory 414. In one or more embodiments, the local controller 204 and the modulator 206 can include or correspond to computer-executable components stored in memory 414. In this regard, the operations described with respect to the local controller 204 and the modulator 206 can include or correspond to executable instructions that can be executed by the at least one processing unit 414. Repetitive description of like elements employed in respective embodiments is omitted for sake of brevity.

The cluster board 108 can also include measurement component 408, other PCB electronic component 410, communication component 418 and a device bus 412 that electrically couples the memory, the processing unit 416, the measurement component 408, the other PCB electronic components 410 and the communication component 418 to one another.

The measurement component 408 can include or correspond to one or more sensors that enable the cluster board 108 to measure various parameters associated with the battery cells 110 to which it is connected. For example, the one or more sensors can include at least one sensor configured to measure the phase current (e.g., $i_a$, $i_b$, or $i_c$) of the respective battery cells 110 (e.g., current flowing into and/or out of the respective battery cell 110). The one or more sensors can also include sensors that can monitor and/or collect other parameter data of the cluster board 108 and/or the battery cells to which the cluster board 108 is connected, such as but not limited to: temperature; pressure (e.g., swelling); chemistry (e.g., chemistry on electrolyte to monitor aging); acceleration (e.g., to sense a crash of, for instance, an electric vehicle comprising device); voltage (e.g., voltage potential across cell material poles of active cell material); and/or other parameter data of the cluster board 108 and/or the battery cells 110.

The communication component 418 can include or correspond to suitable hardware and/or software that enables wireless communication between the cluster board 108 and the master controller 202 and optionally other external systems and/or devices. For example, the communication component 418 can comprise a transmitter, a receiver, and/or a transceiver. The communication component 418 can employ any suitable proprietary and/or non-propriety wireless communication protocols, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example and as described above, the cluster board 108 thus include hardware (e.g., a central processing unit (CPU), a transceiver, a decoder, an antenna, quantum hardware, a quantum processor, etc.), software (e.g., a set of threads, a set of processes, software in execution, quantum pulse schedule, quantum circuit, quantum gates, etc.) or a combination of hardware and software that facilitates communicating information between cluster board 1088 and external systems, sources, and/or devices (e.g., computing devices, communication devices, etc.).

The other PCB electronic components 410 can include or correspond to various other electronic circuit elements that facilitate operations of the cluster board. For example, the other PCB electronic component 410 can include or correspond to one or more switches, wires, ports, and so on. The one or more switches can comprise, for instance, metal-oxide-semiconductor field-effect transistor (MOSFET) switches that can facilitate different operating modes of the battery cells 110 individually and/or the battery cell cluster (e.g., off, positive, negative, bypass, etc.) as controlled by the processing unit 416, the local controller 204 and the modulator 206 in accordance with one or more embodiments of the subject disclosure described herein. In various embodiments, the one or more switches can include an H-bridge electronic circuit having multiple switches (e.g., 4 switches comprising 4 MOSFET switches).

In various embodiments, although not shown, it should be appreciated that the master board 104 can also include or correspond to one or more PCBs having same or similar electronic hardware and software components described above with respect to the cluster board 108 yet tailored to facilitate the operations described herein with respect to the master board 104 (and additional operations). In this regard, it should be appreciated that the master board 104 can include at least one memory (corresponding to memory 414) and at least one processing unit (corresponding to processing unit) that stores computer-executable instructions or components, (e.g., the master controller 202) that when executed by the at least one processor, facilitate performance of the operations described. The master board 104 also includes a communication component corresponding to communication component 418 that enables wireless communication between the master board 104 and the respective cluster boards using any suitable proprietary and/or non-proprietary wireless communication protocol.

With reference to the local controller 204, and process 300 of FIG. 3, in one or more embodiments, the local controller 204 can include control signal processing component 402, three-phase estimation component 404 and local control protocol instructions 406. The control signal processing component 402 can include or correspond to computer-executable instructions that perform the processing and control operations described with respect to steps 310, 312, 314, 318 and/or 320 of process 300. The three-phase estimation component 404 can include or correspond to computer-executable instructions that perform the three-phase estimation process at step 316 of process 300. The local control protocol instructions 406 can define the local control protocol rules and instructions that control the local controller 204 operations in accordance with the main control loop and the local control loop. For example, the local control protocol instructions can define and control when and how the local controller 204 is to direct the modulator 206 to apply the reference required voltage value at 312. In various embodiments, the local control protocol instructions can instruct the local controller to apply the reference required voltage value at 312 in response to initial reception of the master control signal 216 each time it is received in accordance with the first update rate (e.g., every 1.0 ms). The local control protocol instructions 406 can further direct the local controller to perform the local control loop in between reception of the master control signal and apply the estimated required voltage value if it differs from the reference required voltage value at all, or beyond a threshold amount. The local control protocol instructions can also define the threshold amount (when applicable). The local control protocol instructions 406 can also define the second update rate. In this regard, the local control protocol instructions 406 can define the frequency at which the local controller 204 is to measure the single phase current value at 218 and compute a new estimated required voltage value for comparison to the reference required voltage value in between each reception of the master control signal 216 as received in accordance with the first update rate. In various embodiments, the second update rate can correspond to a wireless transmission rate of about 10 kHz. With these embodiments, the second update rate can include or correspond to a rate of about once every 1.0 μs (e.g., corresponding to performing the local control loop about 10 times in between each reception of the master control signal).

The three-phase estimation process performed at 316 of process 300 is now further described with reference to the three-phase estimation component 404 and FIGS. 5-7. As noted above, with the local controllers (e.g., local controller 204) of the respective battery clusters only able to measure the phase current of which it is connected to, the local controllers therefore do not access the data in the dq-format. Therefore, a prediction based of the measured phase is needed in order to estimate the other two phases, enabling the use of the Clarke-Park transformation (e.g., using the three-phase estimation component 404). From this predicted three-phase system the local controller can use the inputs as the measured data.

The prediction of the other two phases follows the assumptions that the difference in the phase angle θ between each phase is 120° and that the amplitude A is equal between all the phases. With these assumptions, the three-phase prediction component 404 can perform the three-phase prediction in accordance with Equation 4.

$$i(t) = A \sin(\theta t + \varphi) \qquad \text{Equation 4.}$$

In accordance with Equation 4, i(t) is the single phase measured current value at a time t, A is the maximum amplitude of the curve, θ is the phase angle, and φ is the phase shift. In this regard, i(t) is already known since it is measured directly on the battery cell cluster (e.g., via the measurement component 408) to which the local controller 204 is connected. The phase shift q is also known since the currents in a three-phase system are assumed to be shifted by 120°. However, both the phase angle θ and the amplitude A need to be estimated.

Figure 5:
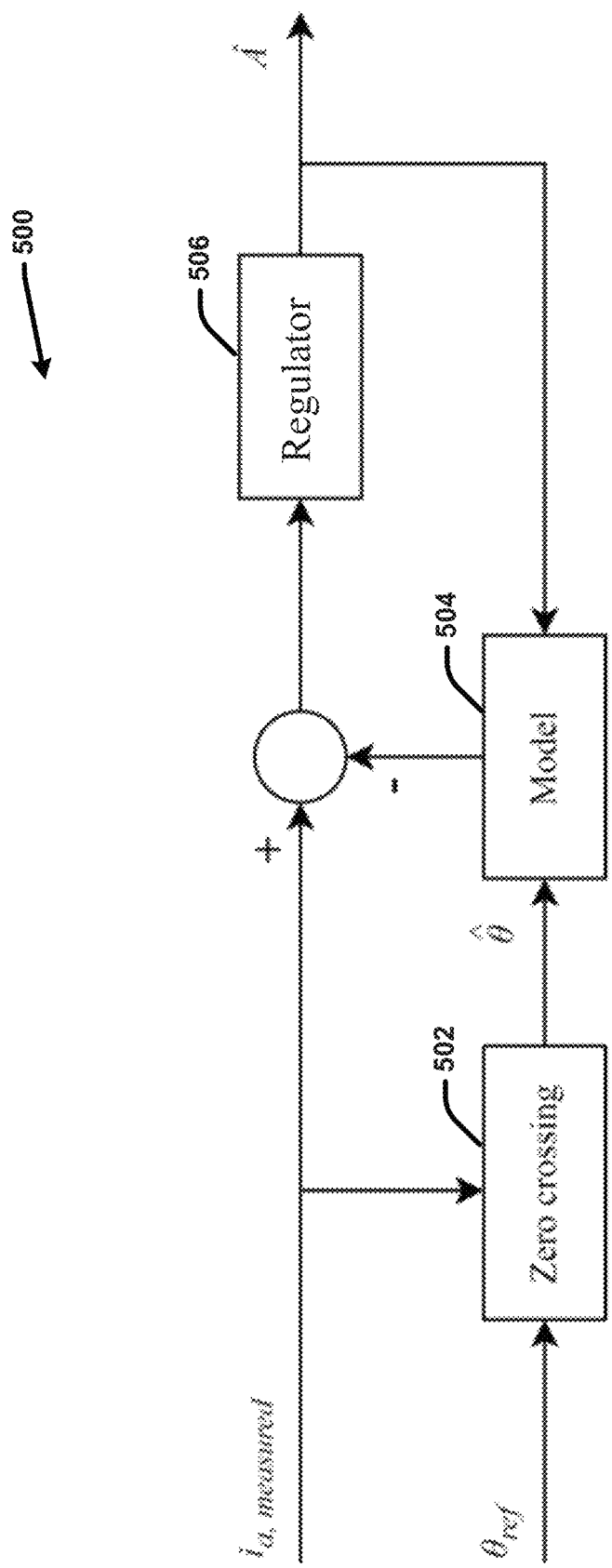
FIG. 5 illustrates a flow diagram of an example process for performing three-phases estimation in accordance with one or more embodiments described herein.

FIG. 5 illustrates a flow diagram of an example process 500 for performing three-phases estimation in accordance with one or more embodiments described herein. In particular, process 500 presents an example process of the amplitude estimation with the data flow of how the three-phase estimation component 404 can estimate 0 and A, wherein $\hat{\theta}$ and $\hat{A}$ correspond to the estimated phase angle value and the estimated amplitude value. With reference to FIGS. 1-5, as illustrated in process 500, in one or more embodiments, the three-phase estimation component 404 can estimate the phase angle $\hat{\theta}$ based on the measured single phase current value (in this example is it for phase A, e.g., $i_a$, measured), a reference phase angle value $\theta_{ref}$, and using a zero crossing function 502. In one or more embodiments, the reference phase angle $\theta_{ref}$ can be determined based on the rotor angle $\theta_r$ sent in the master control signal 216. To calculate the angle between samples, dead reckoning is applied where the previous acceleration and change in acceleration is assumed to not change much during the 0.001 s between updates. In this regard, the angle of the rotor $\theta_r$ is measured on the motor and sent through to the master control signal 216. The three-phase estimation component 404 can determine the electrical angle based on the angle of the rotor $\theta_r$ through the knowledge of how many pole-pairs the motor has. The electrical angle θ is then used as the reference angle $\theta_{ref}$ to base the individual phase shift of the phase using a zero-crossing function 502. In accordance with the zero crossing function 502, the reference angle $\theta_{ref}$ is compared to the measured currents zero crossing level. The difference between the reference angle to either 0 or π depends on in which direction it is crossing. The resulting angle $\hat{A}$ can then be used as the input to a regulator 506 to estimate the amplitude $\hat{A}$. The following process explains the principal of the zero-crossing function 502.

The three-phase estimation component 404 keeps track of whether the measured current ($i_a$) current moves from the positive plane to the negative or the opposite. Then if the current moves from + to − and is crossing the zero point, the difference between 0+ previously calculated offset to π is calculated and added to the previously calculated offset to update it. On the other hand, if the current moves from − to + and is crossing the zero point, the difference between 0+ previously calculated offset to 2π or 0 depending on if it has been over estimated or under since the angle can only be between 0 and 2π. This difference is calculated and added to the previously calculated offset to update it.

With the angle of the phase $\hat{\theta}$ estimated, the amplitude of the current $\hat{A}$ needs to be estimated. In one or more embodiments, the three-phase estimation component 404 can estimate the amplitude of the current $\hat{A}$ based on the angle of the phase $\hat{\theta}$ using a regulator 506, such as a PI regulator, a PID regulator, or another type of regulator (e.g., where there are different benefits and disadvantages such as processing power needed and complexity for different types of regulators). To implement the regulator 506, the three-phase estimation component 404 can use a model 504 based on Equation 4 above to generate an error between the estimate and the measured value, wherein the model 504 corresponds to Equation 5 below.

$$\hat{i}(t) = \hat{A} \sin(\hat{\theta}(t)) \qquad \text{Equation 5.}$$

With $\hat{\theta}$ and $\hat{A}$ the three-phase estimation component 404 can estimate the phase current values for the other two phases. This can be accomplished by offsetting the estimated phase angle $\hat{\theta}$ by 120° in accordance with Equation 5 and model 504. For example, the estimated three-phase current values can respectively derived in accordance with Equations 6, 7 and 8 as follows, where φa=0°, φb=120° and φc=240°.

$$\hat{i}_a(t) = \hat{A} \sin(\hat{\theta}t + \varphi_a) \qquad \text{Equation 6.}$$

$$\hat{i}_b(t) = \hat{A} \sin(\hat{\theta}t + \varphi_b) \qquad \text{Equation 7.}$$

$$\hat{i}_c(t) = \hat{A} \sin(\hat{\theta}t + \varphi_c) \qquad \text{Equation 8.}$$

By following these steps, a single phase current measurement can converted into a three-phase current prediction. This solution needs at least one cycle of the sinusoidal current to have occurred before an estimate is achieved since the angle relies on the zero-crossing to occur, where during that part of the control of the motor can be handled by the master controller 202 as opposed to the local controller 204. This is possible due to the low speed achieved when starting from standstill where the problematic high-speed transients do not occur. This estimation behavior is illustrated in FIG. 6.

Figure 6:
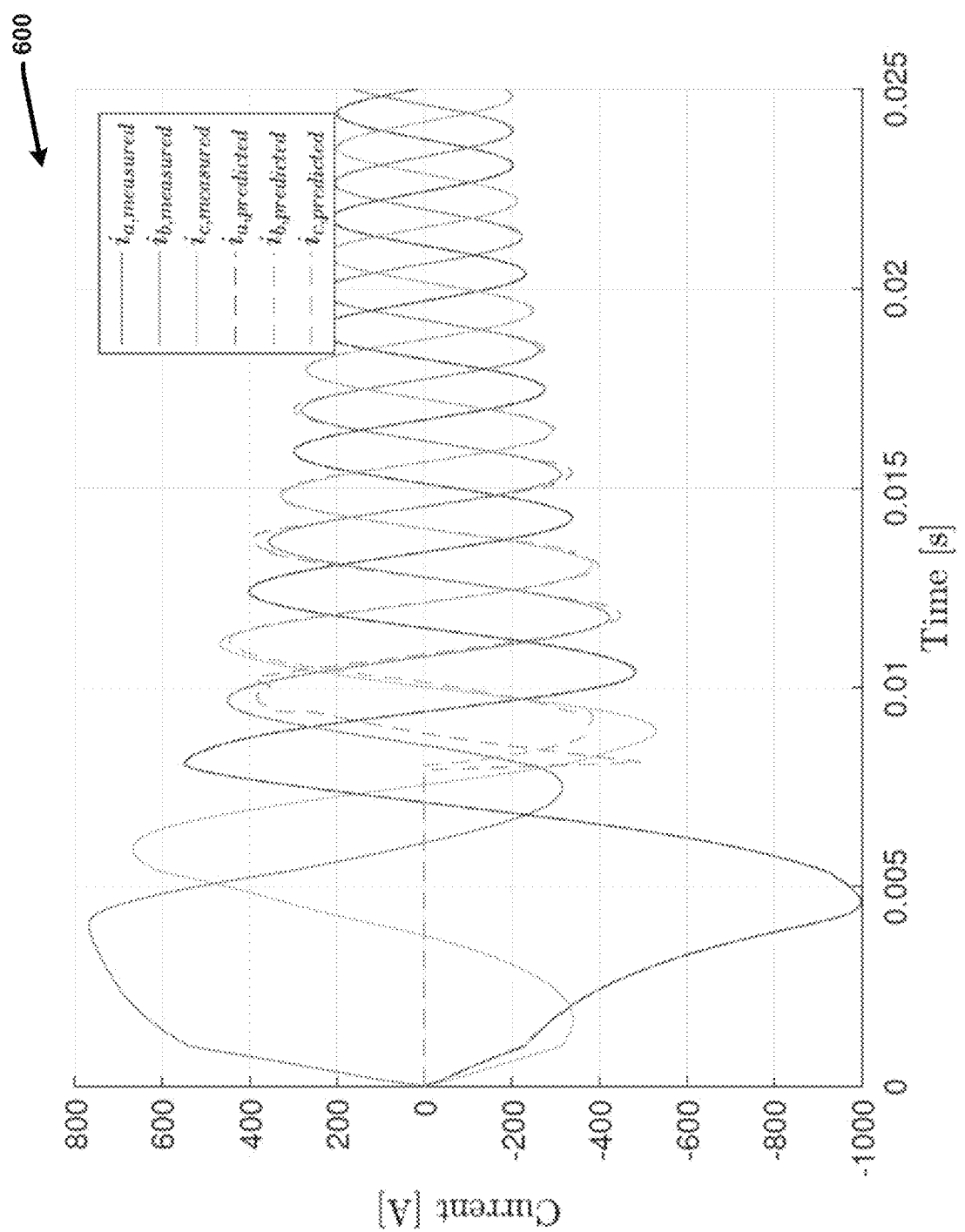
FIG. 6 presents a graph illustrating a resulting three-phase estimation over a period of transition from low speed to high speed in accordance with one or more embodiments described herein.

In this regard, FIG. 6 presents a graph illustrating a resulting three-phase estimation over a period of transition from low speed to high speed in accordance with one or more embodiments described herein. As illustrated in FIG. 6, the predicted three-phase current values can be accurately determined following an initialization period after initially starting up the vehicle 100 and/or driving the vehicle for a short period of time (e.g., less than one second) and accelerating from a low speed to a higher speed. The startup behavior of the estimation is due to the angle needing to be estimated to a reasonable degree before an amplitude can accurately be estimated. As discussed above, the angle is estimated by looking at the zero-crossing point of the measured phase and with that adding an offset to the rotor angle measurement. This leads to the model needing at least two zero-crossing points to occur before an amplitude estimation can be performed.

With reference again to FIGS. 3 and 4, once the estimated three-phase current values have been determined (e.g., estimated $i_a$, $i_b$, and $i_c$), the control signal processing component 402 can determine the estimated required voltage value (est. $U_{required}$) for the amount of voltage needed for provision to the motor 102 to achieve the requested operating speed as described with reference to step 318 and process 300. In this regard, the control signal processing component 402 can convert the estimated three-phase current values (e.g., estimated current $i_a$, $i_b$ and $i_c$) into the dq-frame using the Clark and Park transformations to obtain estimated current $i_d$ and $i_q$ values. At this stage, all signals needed to regulate the required current are possible since the requested voltage $U_d$, $U_q$ and the required current $I_d$ and $I_q$ are sent over the radio protocol and included in the master control signal 216, and the three-phase measured/estimated current is converted into the dq-frame. In this regard, the control signal processing component 402 can further compare the estimated current $i_d$, $i_q$ with the required current $I_d$, $I_q$ measurements received in the master control signal 216 at 310 to determine the estimated required voltage (est. $U_{required}$) based on the difference between the estimated current $i_d$, $i_q$ and the required current $I_d$, $I_q$. The estimated required voltage (est. $U_{required}$) can also be expressed in the dq-frame.

Figure 7:
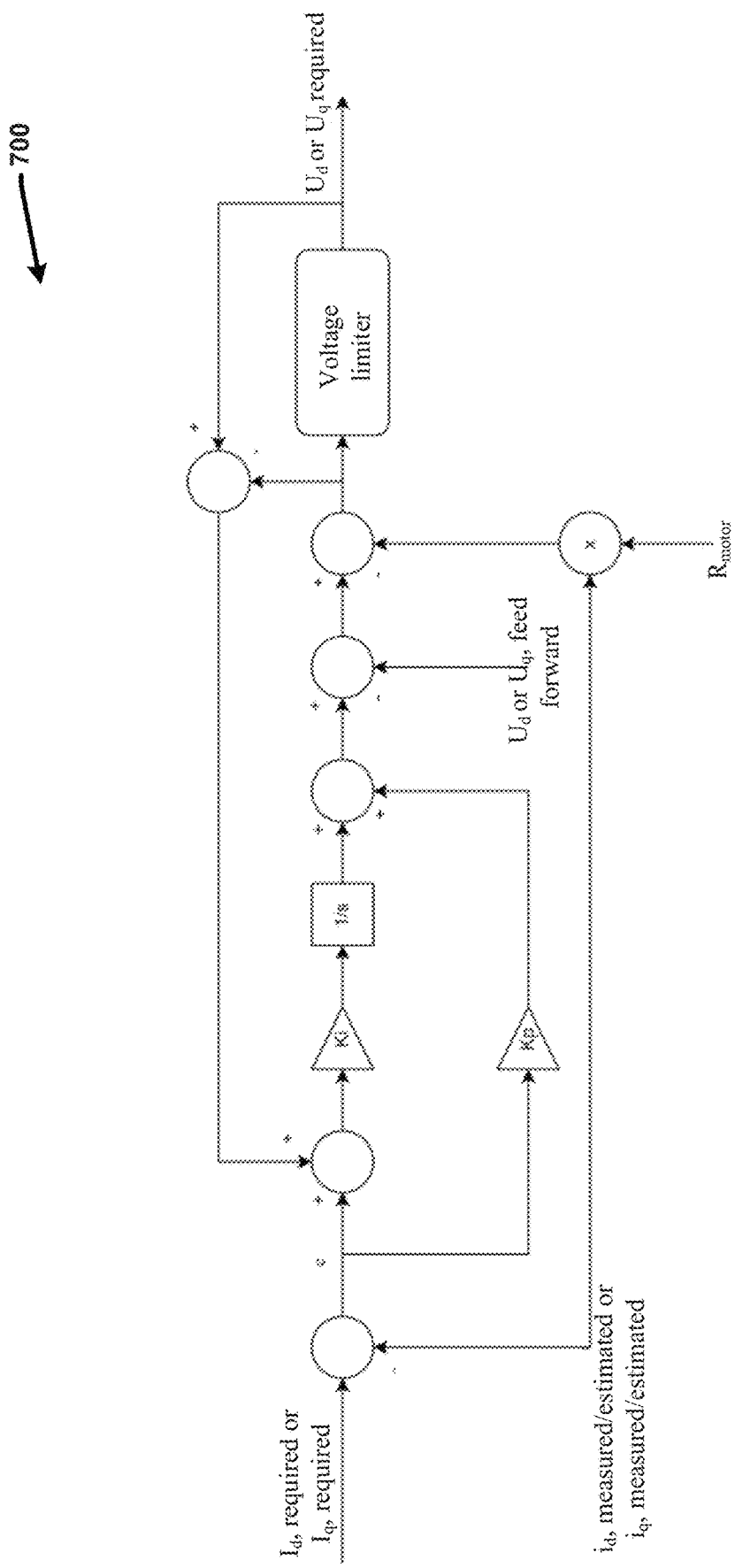
FIG. 7 illustrates a flow diagram of an example process for converting the measured current into a required voltage in accordance with one or more embodiments described herein.
Figure 8:
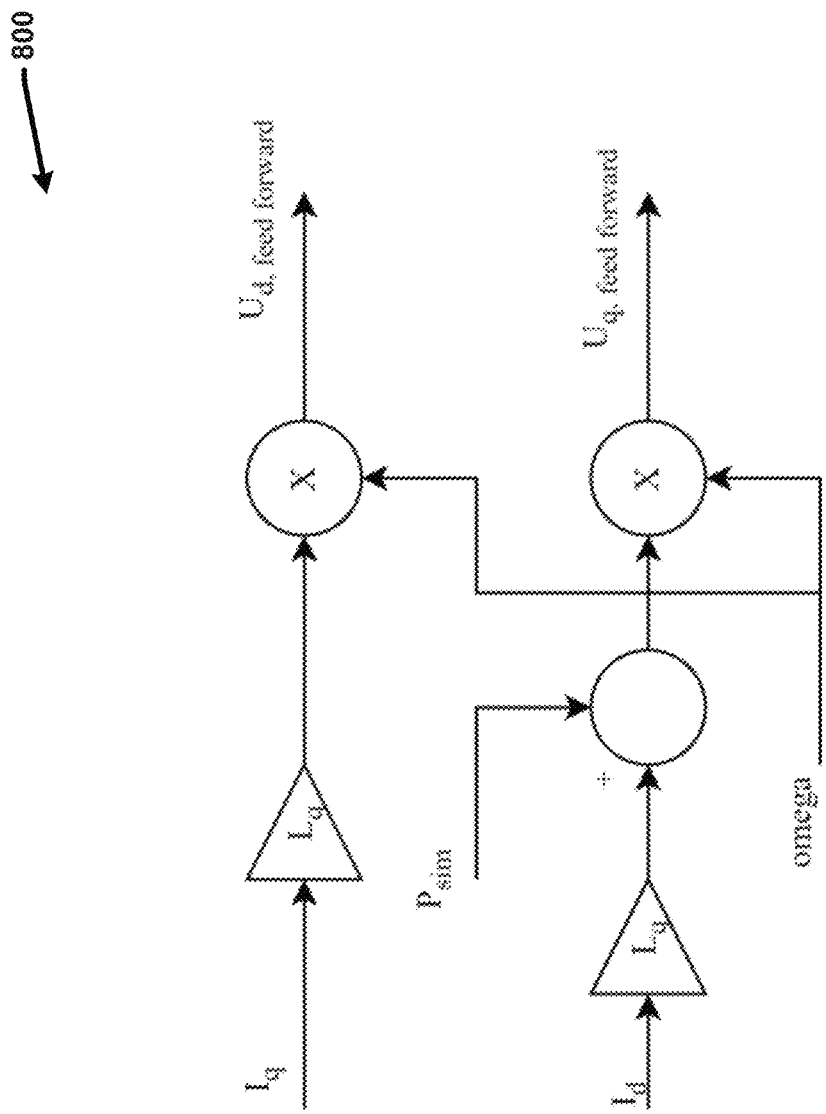
FIG. 8 illustrates a flow diagram of an example process for converting the measured current into the feed forward voltage in accordance with one or more embodiments described herein.

FIG. 7 illustrates a flow diagram of an example process 700 for converting the measured/estimated current values $i_d$ and $i_q$ into a required voltage $U_d$ or $U_q$ required in accordance with one or more embodiments described herein. In various embodiments, process 700 can be performed by both the local controller 204 (based on the estimated three-phase current values) and the master controller 202 (e.g., based on the actual measure three-phase phase current values reported by the respective local controllers) to determine the estimated required voltage and the reference required voltage, respectively. As illustrated in process 700, in one or more embodiments, the control signal processing component 402 can use a current regulator function (e.g., process 700) to convert the measured/estimated current in the q-frame and/or the d-frame based on the required current $I_d$ and $I_q$, $U_d$, $U_q$ feed forward values, an $R_{motor}$ value and a voltage limiter. FIG. 8 illustrates a flow diagram of an example process 800 for obtaining the $U_d$, $U_q$ feed forward values used in process 700 in accordance with one or more embodiments described herein. With reference to FIGS. 7 and 8, in accordance with process 700, $R_{motor}$ is the resistance in the rotor where the material and temperature of the winding is calculated. In accordance with process 800 Ufeedforward is calculated using both the required $I_d$ and $I_q$. In accordance with process 700, either the d or q Ufeedforward is used depending on what is calculated. Lastly the voltage limiter limits the output signal to never exceeding the voltage level available in through the batteries.

With this local controller the estimated Ureference is compared to the signal acquired from the radio transmission where during the time in between samples the local controller 204 is in control and the master controller 204 is in control when it updates at the first update rate. Enabling this passthrough feature of the radio protocol signal enables the local controller 202 to break in between each reception of the master control signal 216. From this Ureference is sent to the modulator 206 where a PWM (Pulse Width Modulated) signal creates the sinusoidal wave needed to run the motor.

In accordance with the disclosed techniques, the local controller 204 new can be placed on every cluster in the smartcell battery system 103. The number of clusters is decided by the space of where the clusters are placed and other external factors and not by the controller. Since the implementation is the same for each cluster, the system is easily scalable since the input of data to each cluster is transmitted wirelessly and not restricted by any wires or connections and only the availability of receiving the transmission. The local controllers 204 that are connected to the same phase should get the same estimated values. This is because they take measurements at the same phase and all receive the same data from the master controller 202. Therefore, two identical controllers with the same input will result in the same conclusion which scales with more cluster boards 108.

Figure 9:
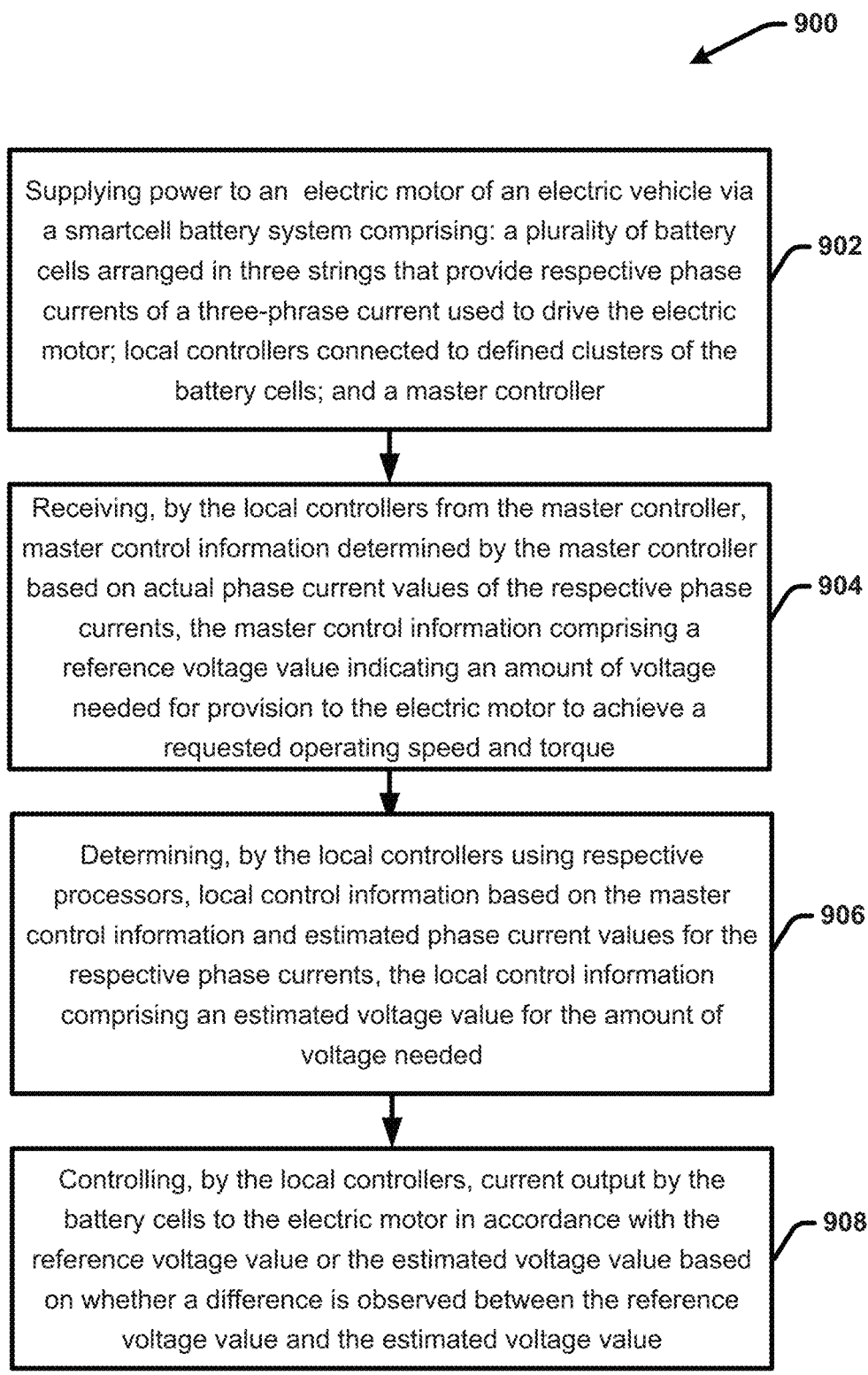
FIG. 9 illustrates an example, computer-implemented method for controlling an electric motor of an electric vehicle that employs a smartcell battery system in accordance with one or more embodiments described herein.

FIG. 9 illustrates an example, computer-implemented method 900 for controlling an electric motor of an electric vehicle that employs a smartcell battery system in accordance with one or more embodiments described herein. Repetitive description of like elements employed in respective embodiments is omitted for sake of brevity.

Method 900 comprises, at 902, supplying power to an electric motor of an electric vehicle via a smartcell battery system comprising: a plurality of battery cells arranged in three strings that provide respective phase currents of a three-phrase current used to drive the electric motor; local controllers connected to defined clusters of the battery cells; and a master controller. At 904, receiving, by the local controllers from the master controller, master control information determined by the master controller based on actual phase current values of the respective phase currents, the master control information comprising a reference voltage value indicating an amount of voltage needed for provision to the electric motor to achieve a requested operating speed and torque. At 906, determining, by the local controllers using respective processors, local control information based on the master control information and estimated phase current values for the respective phase currents, the local control information comprising an estimated voltage value for the amount of voltage needed. At 908, controlling, by the local controllers, current output by the battery cells to the electric motor in accordance with the reference voltage value or the estimated voltage value based on whether a difference is observed between the reference voltage value and the estimated voltage value.

The one or more flowcharts and/or block diagrams in the figures illustrate the architecture, functionality, and operation of one or more possible implementations of one or more systems, apparatuses and/or methods according to various embodiments described herein. In this regard, one or more blocks in the one or more flowcharts and/or block diagrams can represent a module, segment and/or portion of instructions, which can comprise one or more executable instructions for implementing the specified logical function(s). In one or more alternative implementations, one or more functions noted in one or more of the blocks can occur out of the order illustrated in the Figures. For example, one or more blocks shown in succession can be executed substantially concurrently and/or the one or more blocks can be executed in a reverse order as that illustrated, such as depending upon a functionality involved. It also will be noted that one or more blocks of the one or more flowcharts and/or block diagrams, and/or one or more combinations of one or more blocks thereof, can be implemented by a special purpose hardware-based system that can perform one or more of the specified functions and/or can carry out one or more special purpose hardware and/or computer instructions.

As indicated, one or more aspects are described herein with reference to one or more flowchart illustrations and/or block diagrams of one or more methods, apparatuses and/or systems according to one or more embodiments described herein. It will be understood that one or more blocks of the one or more flowcharts and/or block diagrams, and/or one or more combinations of blocks in the one or more flowcharts and/or block diagrams, can be implemented by one or more computer-readable program instructions.

The computer-readable program instructions can be provided to a processor of a general purpose computer, special purpose computer and/or other programmable data processing apparatus to produce a machine. For example, the instructions, which can execute via the processor of the computer and/or other programmable data-processing apparatus, can create one or more means for implementing the one or more functions and/or processes specified in the one or more flowchart and/or block diagram blocks. The computer-readable program instructions can be stored in a computer-readable storage medium that can direct a computer, programmable data processing apparatus and/or other device to function in a particular manner. For example, the computer-readable storage medium having instructions stored therein can comprise an article of manufacture including instructions that can implement one or more aspects of the one or more functions and/or processes specified in the one or more flowchart and/or block diagram blocks. The computer-readable program instructions can be loaded onto a computer, other programmable data processing apparatus and/or other device to cause one or more operational acts to be performed on the computer, other programmable apparatus and/or other device to produce a computer-implemented process. For example, the instructions that can execute on the computer, other programmable apparatus and/or other device can implement the one or more functions and/or processes specified in the one or more flowchart and/or block diagram blocks.

As it is employed in the subject specification, the term "processor" or "processing unit" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a graphics processing unit (GPU), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. As used herein, terms such as "store," "storage," "data store," data storage," "database," and substantially any other information storage component relevant to operation and functionality of a component are utilized to refer to "memory components," entities embodied in a "memory," or components comprising a memory. A processor can employ distributed and/or federated machine intelligence, which can be employed to operate and/or facilitate one or more of the aforementioned computer-readable program instructions.

Memory and/or memory components described herein can be either volatile memory or nonvolatile memory, and/or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described herein includes one or more mere examples of one or more systems and/or methods. It is, of course, not possible to describe every conceivable combination of components and/or system-implemented methods for purposes of describing the subject matter. Nonetheless, one of ordinary skill in the art can recognize that one or more further combinations and/or permutations of the disclosed subject matter are possible. Furthermore, to the extent that the terms "includes", "has", "possesses" and/or the like are used in the detailed description, claims, appendices and/or drawings, such terms are intended to be inclusive in a manner similar to the term "comprising" as "comprising" is interpreted when employed as a transitional word in a claim.

It will be understood that when an element is referred to as being "coupled" to another element, the term "coupled" can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling and/or another type of coupling. As referenced herein, an "entity" can comprise a machine, device, hardware, software, computing device and/or human. Such entity can facilitate implementation of the subject matter disclosed herein in accordance with one or more embodiments described herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance and/or illustration. For the avoidance of doubt, the subject matter disclosed herein is not limited by such examples. In addition, any aspect and/or design described herein as an "example" and/or "exemplary" is not necessarily to be construed as preferred and/or advantageous over other aspects or designs, nor is it meant to preclude equivalent exemplary structures and/or techniques known to those of ordinary skill in the art.

The description of the one or more various embodiments provided herein has been presented for purposes of illustration but is not intended to be exhaustive and/or limited to the one or more embodiments disclosed. One or more modifications and/or variations will be apparent to those of ordinary skill in the art without departing from the scope and/or spirit of the described embodiments. The terminology used herein was chosen to best explain the principles of the embodiments, practical application and/or technical improvement over technologies found in the marketplace, and/or to enable others of ordinary skill in the art to understand the embodiments disclosed herein.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a smartcell battery system that supplies power to an electric motor of an electric vehicle, the smartcell battery system comprising:
        a plurality of battery cells arranged in three strings that provide respective phase currents of a three-phrase current used to drive the electric motor;
        local controllers connected to defined clusters of the battery cells; and
        a master controller;
    at least one processor; and
        at least one memory that stores executable instructions that, when executed by the at least one processor, facilitate performance of operations, comprising:
        receiving, by the local controllers from the master controller, master control information determined by the master controller based on actual phase current values of the respective phase currents;
        determining, by the local controllers, local control information based on the master control information and estimated phase current values for the respective phase currents; and
        controlling, by the local controllers, current output by the battery cells to the electric motor in accordance with the master control information or the local control information based on whether a difference is observed between the master control information and the local control information.

2. The system of claim 1, wherein the master control information comprises a reference voltage value indicating an amount of voltage needed for provision to the electric motor to achieve a requested operating speed and torque, wherein the local control information comprises an estimated voltage value for the amount of voltage needed, and wherein the controlling comprises controlling the current output in accordance with the reference voltage value or the estimated voltage value based on whether a difference is observed between the reference voltage value and the estimated voltage value.

3. The system of claim 1, wherein the receiving comprises receiving the master control information repeatedly at a first update rate, and wherein the determining comprises determining the local control information repeatedly at a second update rate faster than the first update rate.

4. The system of claim 3, wherein the controlling further comprises:
    directing, by the local controllers, the battery cells to generate the current output based on the master control information in response to initial reception of the master control information each time the master control information is received; and
    directing, by the local controllers, the battery cells to generate the current output based on the local control information in between reception of the master control information if the local control information differs from the master control information.

5. The system of claim 3, wherein the receiving comprises receiving the master control information via a wireless communication signal transmitted by the master controller, and wherein the first update rate is based on a maximum transmission rate of a wireless communication protocol used for the wireless communication signal.

6. The system of claim 4, wherein the maximum transmission rate is at least 1.0 kilohertz, and wherein the second update rate corresponds to a transmission rate of at least 10.0 kilohertz.

7. The system of claim 1, wherein the local controllers comprise a first subset of local controllers connected to a first string of the three strings, a second subset of local controllers connected to a second string of the three strings, and a third subset of local controllers connected to a third string of the three strings, and wherein the operations further comprise:
    determining, by the local controllers, the estimated phase current values based on actual single phase current values measured by the local controllers from respective ones of the three strings to which the local controllers are connected.

8. The system of claim 7, wherein determining the estimated phase current values comprises:
    measuring, by the local controllers, a first single phase current value of the three-phase current from respective ones of the three strings to which the local controllers are connected; and
    estimating, by the local controllers, second and third phase current values of the three-phase current for respective other strings of the three strings to which the local controllers are disconnected.

9. The system of claim 8, wherein determining the estimated current values further comprises:
    estimating, by the local controllers, a phase angle associated with the first single phase current value; and
    estimating, by the local controllers, a current amplitude associated with the first single phase current value.

10. The system of claim 9, wherein estimating the angle comprises estimating the angle based on a reference rotor angle included in the master control information and using a zero-crossing function.

11. The system of claim 7, wherein determining the estimated current values is based on an assumption that a difference in angle between the respective phase currents is 120 degrees and an amplitude of the respective phases currents is equal.

12. A method for controlling an electric motor of an electric vehicle, comprising:
    supplying power to the electric motor via a smartcell battery system comprising:
        a plurality of battery cells arranged in three strings that provide respective phase currents of a three-phrase current used to drive the electric motor;
        local controllers connected to defined clusters of the battery cells; and
        a master controller;
    receiving, by the local controllers from the master controller, master control information determined by the master controller based on actual phase current values of the respective phase currents, the master control information comprising a reference voltage value indicating an amount of voltage needed for provision to the electric motor to achieve a requested operating speed and torque;

determining, by the local controllers using respective processors, local control information based on the master control information and estimated phase current values for the respective phase currents, the local control information comprising an estimated voltage value for the amount of voltage needed; and controlling, by the local controllers, current output by the battery cells to the electric motor in accordance with the reference voltage value or the estimated voltage value based on whether a difference is observed between the reference voltage value and the estimated voltage value.

13. The method of claim 12, wherein the receiving comprises receiving the master control information repeatedly at a first update rate, and wherein the determining comprises determining the local control information repeatedly at a second update rate faster than the first update rate.

14. The method of claim 13, wherein the controlling further comprises:

directing, by the local controllers, the battery cells to generate the current output based on the reference voltage value in response to initial reception of the master control information each time the master control information is received; and directing, by the local controllers, the battery cells to generate the current output based on the estimated voltage value in between reception of the master control information if the estimated voltage value differs from the reference voltage value.

15. The method of claim 13, wherein the receiving comprises receiving the master control information via a wireless communication signal transmitted by the master controller, and wherein the first update rate is based on a maximum transmission rate of a wireless communication protocol used for the wireless communication signal.

16. The method of claim 12, wherein the local controllers comprise a first subset of local controllers connected to a first string of the three strings, a second subset of local controllers connected to a second string of the three strings, and a third subset of local controllers connected to a third string of the three strings, and wherein the method further comprises:

determining, by the local controllers, the estimated phase current values based on actual single phase current values measured by the local controllers from respective ones of the three strings to which the local controllers are connected.

17. The method of claim 16, wherein determining the estimated phase current values comprises:

measuring, by the local controllers, a first single phase current value of the three-phase current from respective ones of the three strings to which the local controllers are connected; and estimating, by the local controllers, second and third phase current values of the three-phase current for respective other strings of the three strings to which the local controllers are disconnected.

18. The method of claim 17, wherein determining the estimated current values further comprises:

estimating, by the local controllers, a phase angle associated with the first single phase current value; and estimating, by the local controllers, a current amplitude associated with the first single phase current value.

19. A computer program product that facilitates controlling an electric motor of an electric vehicle powered by a smartcell battery system, the smartcell battery system comprising:

a plurality of battery cells arranged in three strings that provide respective phase currents of a three-phrase current used to drive the electric motor;

local controllers connected to defined clusters of the battery cells; and a master controller;

the computer program product comprising a non-transitory computer readable medium having program instructions embodied therewith, the program instructions executable by respective processors of the local controllers to cause the respective processors to:

receive master control information determined by the master controller based on actual phase current values of the respective phase currents, the master control information comprising a reference voltage value indicating an amount of voltage needed for provision to the electric motor to achieve a requested operating speed and torque;

determine local control information based on the master control information and estimated phase current values for the respective phase currents, the local control information comprising an estimated voltage value for the amount of voltage needed; and control current output by the battery cells to the electric motor in accordance with the reference voltage value or the estimated voltage value based on whether a difference is observed between the reference voltage value and the estimated voltage value.

20. The computer program product of claim 19, wherein the respective processors receive the master control information repeatedly at a first update rate, and wherein the determine the local control information repeatedly at a second update rate faster than the first update rate.

* * * * *